United States Patent
Kurita et al.

[11] Patent Number: 5,992,015
[45] Date of Patent: Nov. 30, 1999

[54] PROCESS FOR FORMING COMPOSITE PISTON

[75] Inventors: Hirotaka Kurita; Toshikatsu Koike; Hiroshi Yamagata, all of Iwata, Japan

[73] Assignee: Yamaha Hatsudoki Kabushiki Kaisha, Iwata, Japan

[21] Appl. No.: 09/061,614

[22] Filed: Apr. 16, 1998

Related U.S. Application Data

[62] Division of application No. 08/859,536, May 20, 1997.

[30] Foreign Application Priority Data

May 20, 1996 [JP] Japan ................................ 8-124386
Jun. 5, 1996 [JP] Japan ................................ 8-142704

[51] Int. Cl.$^6$ .................................................. B23P 15/00
[52] U.S. Cl. ................................ 29/888.042; 29/888.044
[58] Field of Search ........................ 29/888.042, 888.044; 92/222, 224, 260; 123/193.6

[56] References Cited

U.S. PATENT DOCUMENTS

| | | |
|---|---|---|
| 2,707,136 | 4/1955 | Fahlman . |
| 4,434,014 | 2/1984 | Smith . |
| 4,440,069 | 4/1984 | Holtzberg et al. .......................... 92/224 |
| 5,065,508 | 11/1991 | Lorento et al. ............................ 92/222 |
| 5,170,556 | 12/1992 | Kamimura et al. ................. 29/888.044 |
| 5,245,752 | 9/1993 | Lippai et al. ......................... 123/193.6 |
| 5,259,294 | 11/1993 | May ..................................... 29/888.044 |

FOREIGN PATENT DOCUMENTS

| | | |
|---|---|---|
| 0153 473 A2 | 12/1984 | European Pat. Off. . |
| 1226350 | 7/1960 | France . |
| 3719121 A1 | 12/1988 | Germany . |
| 3822031 A1 | 1/1990 | Germany . |
| 63-126661 | 5/1988 | Japan . |
| 63-132743 | 6/1988 | Japan . |
| 1-180927 | 7/1989 | Japan . |
| 2-233858 | 9/1990 | Japan . |
| 9-76042 | 3/1997 | Japan . |
| 449 719 | 1/1971 | Switzerland . |

*Primary Examiner*—I Cuda
*Attorney, Agent, or Firm*—Knobbe, Martens, Olson & Bear LLP

[57] ABSTRACT

In a method of manufacturing the piston, a first block including first alloy and a second block including a second alloy are press-forged to form a piston. The piston has a head and a skirt, with the head including at least a portion of the first alloy and the skirt including at least a portion of the second alloy. The first alloy preferably including an aluminum-iron based alloy, and the second alloy preferably comprises an aluminum-silicon based alloy. Preferably, during the forging process an interface between the blocks is increased in length or area, whereby oxide layers on the blocks are destroyed and the material comprising the two alloys is bonded directly.

15 Claims, 9 Drawing Sheets

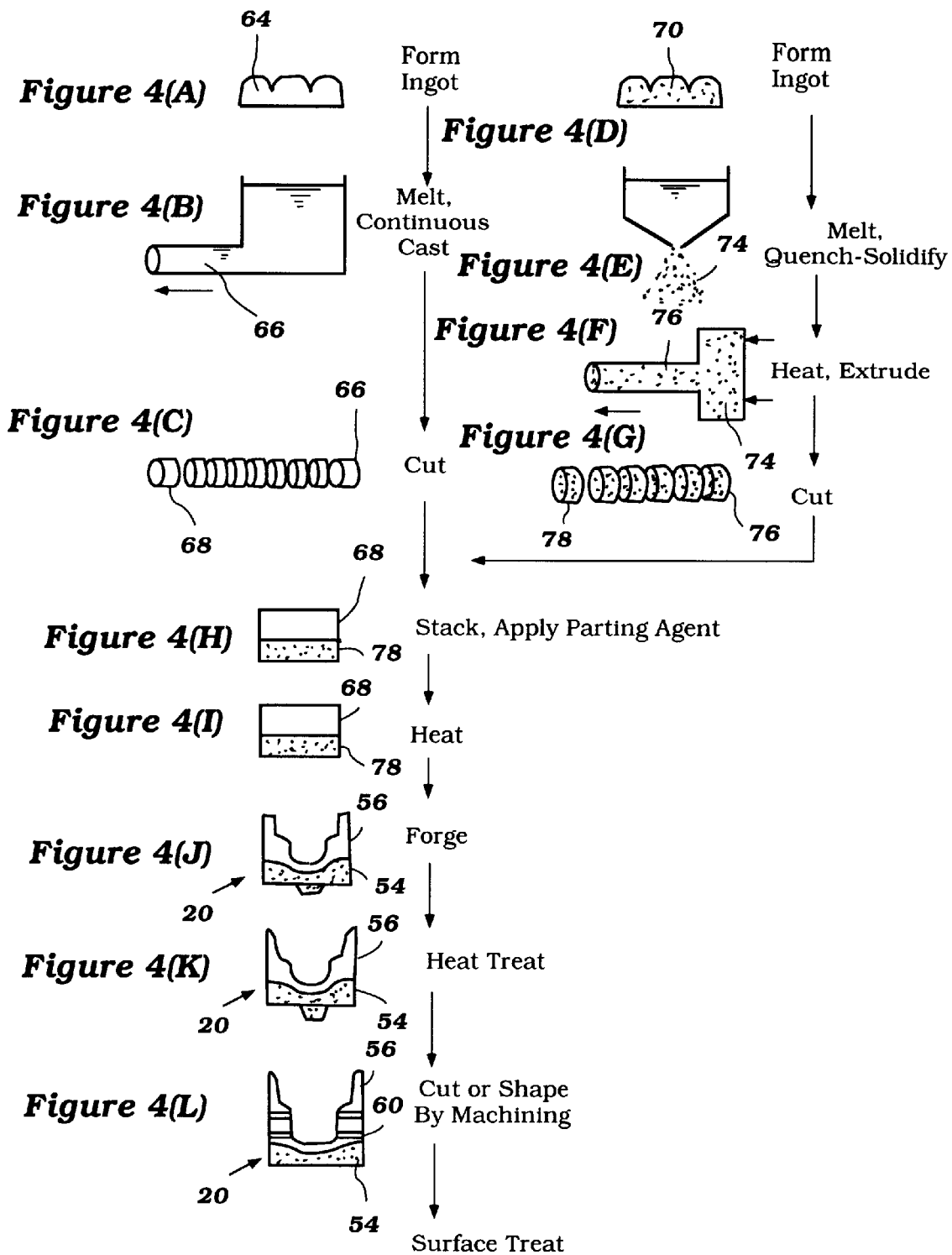

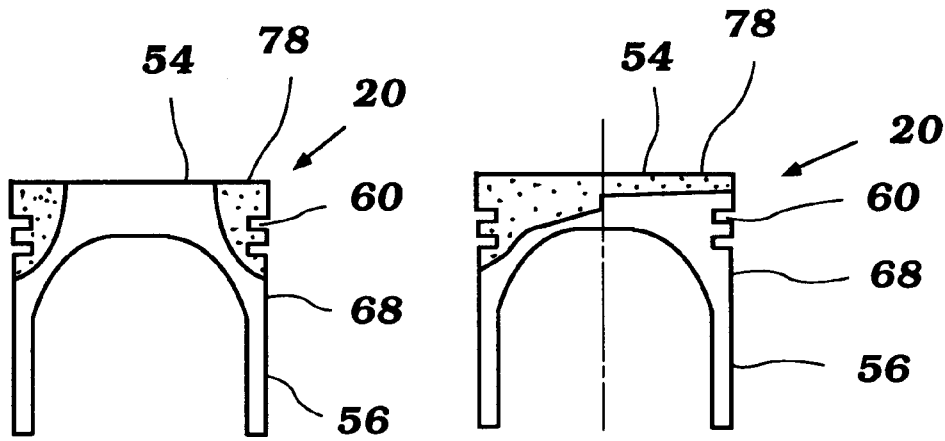
Figure 7(A) Figure 7(B)
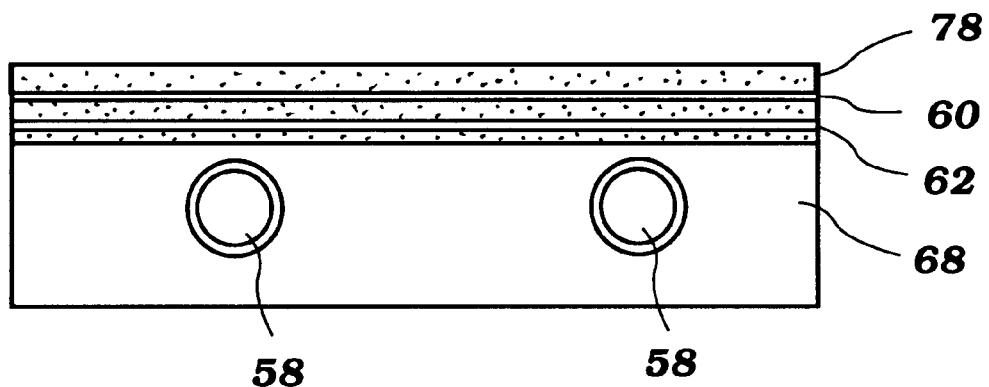
Figure 7(C)
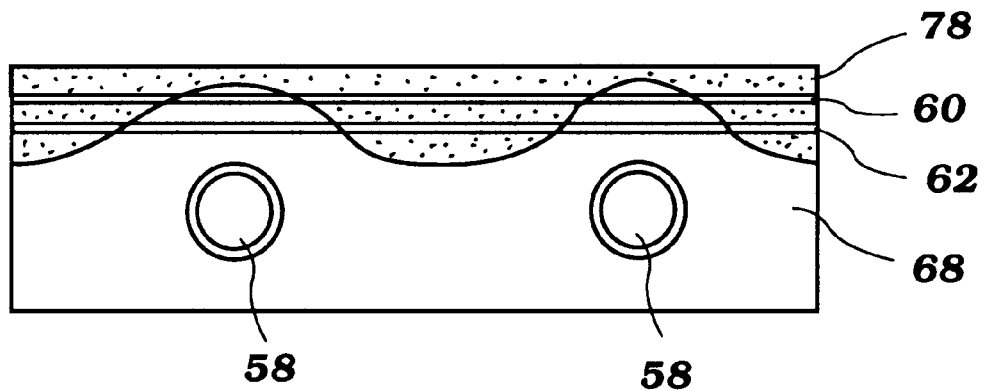
Figure 7(D)

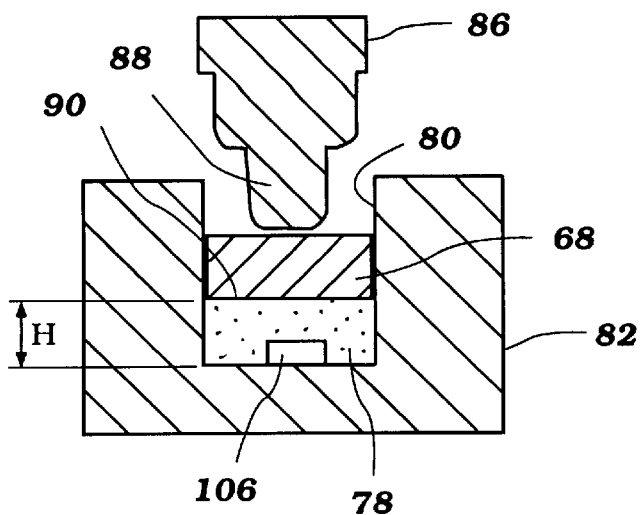
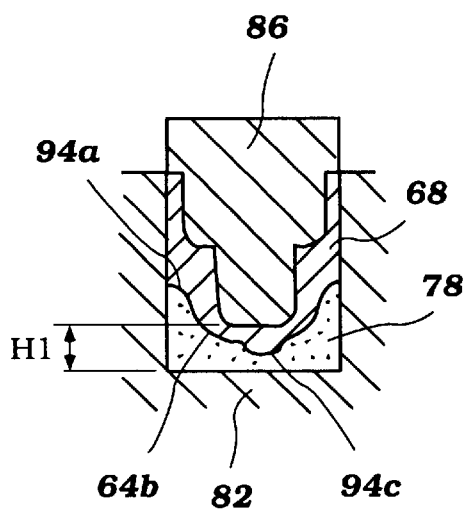
Figure 8(A)  Figure 8(B)
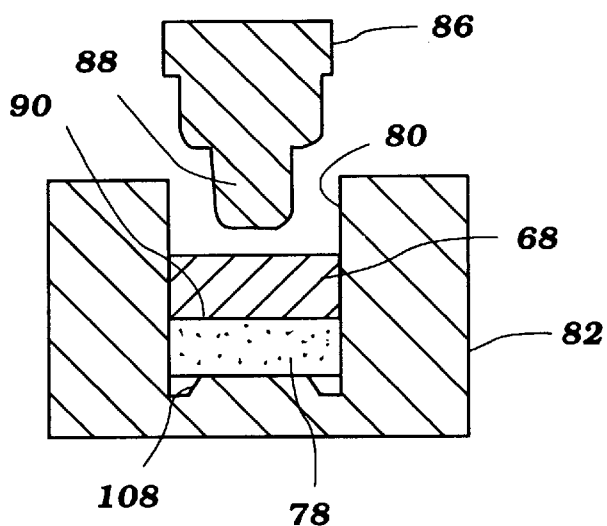
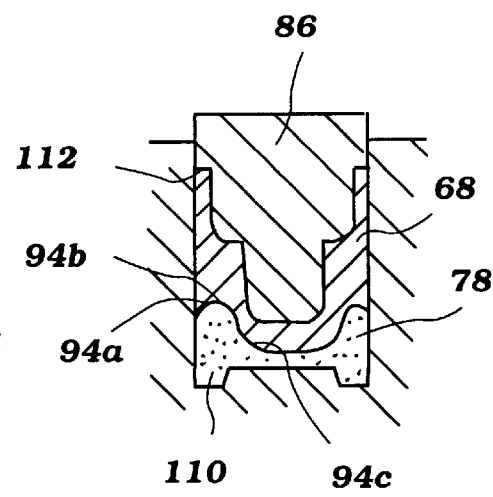
Figure 9(A)  Figure 9(B)

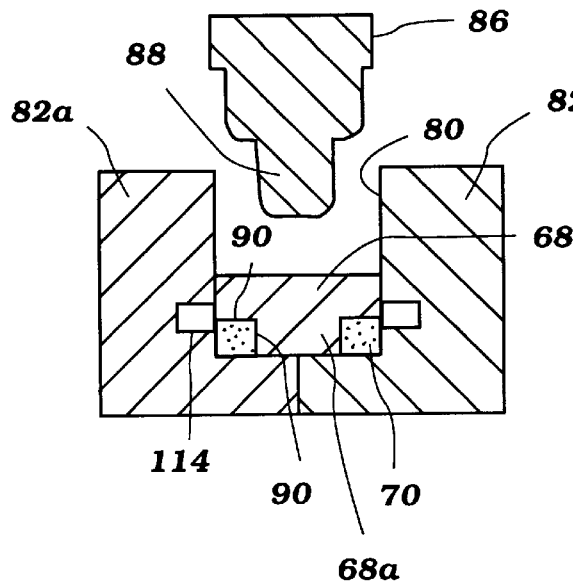
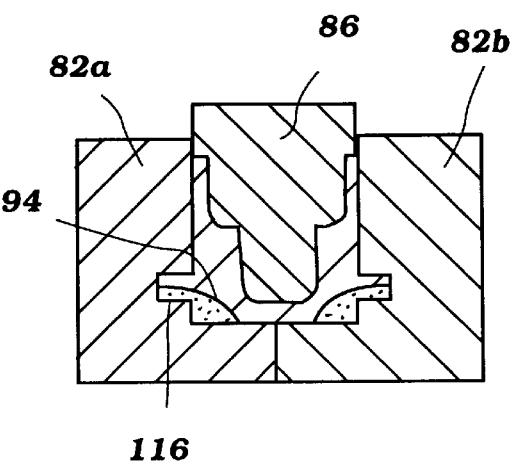
Figure 10(A)  Figure 10(B)
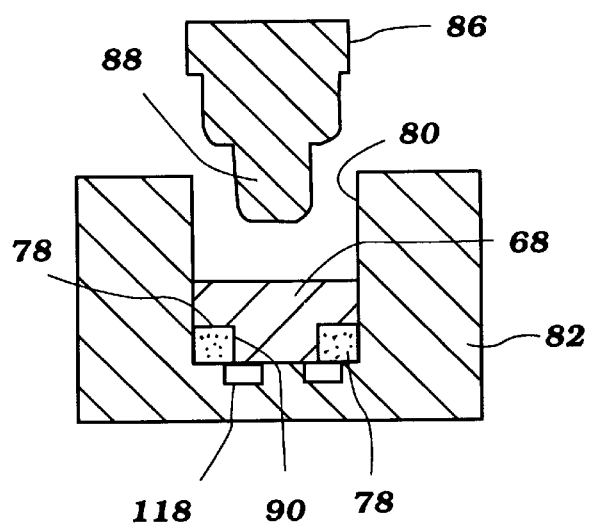
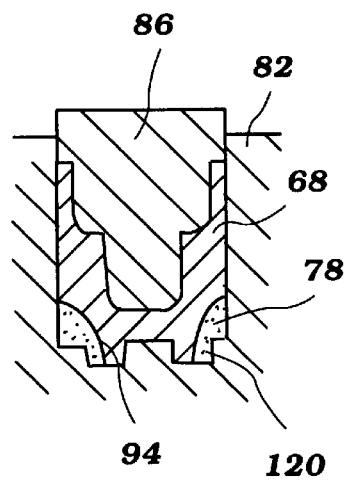
Figure 11(A)  Figure 11(B)

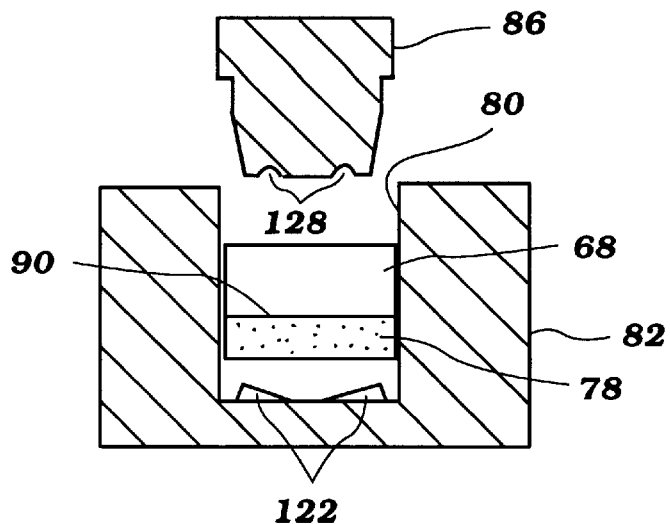
Figure 12(A)
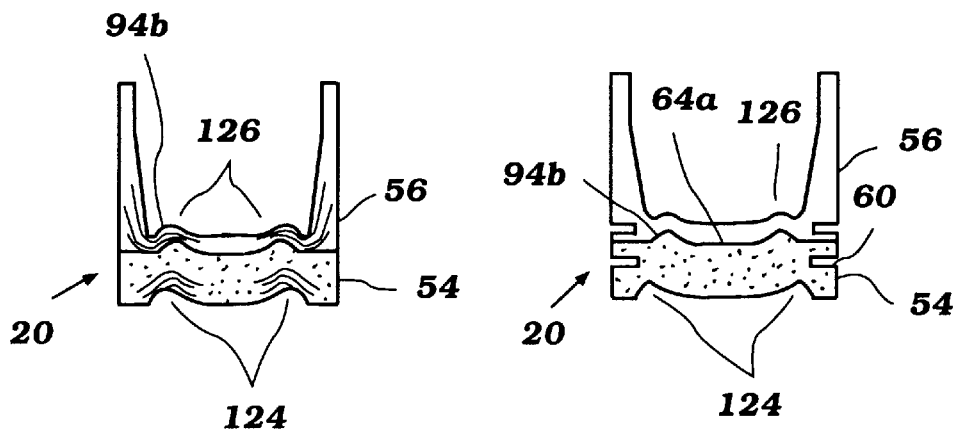
Figure 12(B)  Figure 12(C)
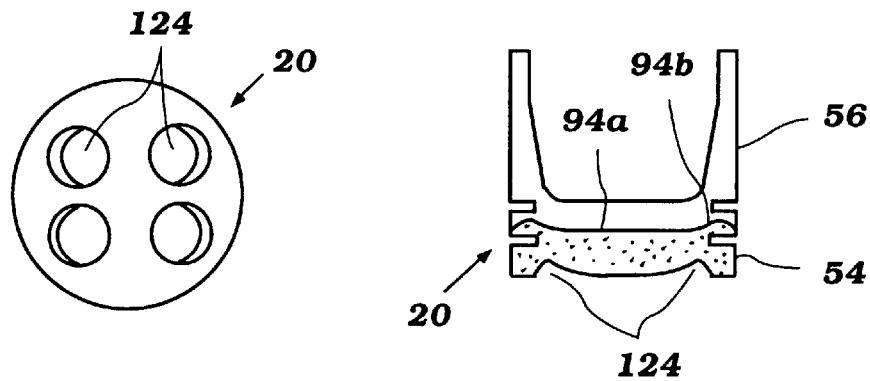
Figure 12(D)  Figure 12(E)

PROCESS FOR FORMING COMPOSITE PISTON

CROSS REFERENCE TO RELATED APPLICATION

This application is a division of our application Ser. No. 08/859,536 filed May 20, 1997 and assigned to the assignee hereof.

FIELD OF THE INVENTION

The present invention relates to a piston for an internal combustion engine and a method of making the piston.

BACKGROUND OF THE INVENTION

Internal combustion engines are frequently of the piston-type. The piston(s) of these engines are subjected to extreme forces, frictional wear, and high temperature. In addition, the shape and size of the piston greatly affects the performance of the engine. So that the piston and the engine perform optimally, the piston should satisfy several criteria.

First, the piston should be light-weight. For among other reasons, reducing the weight of the piston reduces inertial forces generated by the piston as its moves within the engine. Generally, for the piston to be light-weight, it must be thin walled to reduce its mass, and be constructed of a low-density material.

The height of the land portion of the piston (i.e. that portion of the piston above the piston ring) should be small. This reduced height increases the compression ratio, which results in increased engine performance. In addition, the shorter land results in a smaller crevice or "squish" volume, causing a reduction in the amount of unburned fuel, improving exhaust emissions. For the piston to have a short land, it is normally necessary for the piston material to maintain its hardness even at temperatures above about 350° C. so as not to thermally fuse the ring(s) thereto and so that the corner of the land does not yield or deform at high temperature (i.e. above about 350° C.).

Not only must the land portion of the piston not deform for the reasons described above, but the other portions of the piston, such as the skirt, must also not deform during the piston's use. This normally requires that the piston be thick-walled and be constructed of a material which retains a high Young's modulus even at high temperatures (i.e. above about 350° C. on the piston's top surface).

In sum, the piston must have a high fatigue strength, a high proof strength, and a high hardness at high temperatures, and yet be constructed from a material which has a low density and allows the piston to be of a thin-walled construction. Further, the piston material must on the one hand provide high strength and hardness, and yet must be yieldable if the piston is to be forged (as opposed to cast or machined, both of which processes increase the cost of manufacture of the piston). To date, no material and piston configuration has satisfied all of these criteria.

As one attempt at satisfying these criteria, it is known to construct a piston having a head portion which is clad with a different material than a material which clads a skirt portion of the piston (such as by having the first cladding material comprise aluminum and the other comprise a compound layer made of aluminum mixed with fibers of material). The claddings comprising different materials are joined together by forging.

This arrangement is disadvantageous because insufficient joining strength is provided at the interface between the joined materials. Generally, this is now believed to be, in part, due to the fact that insufficient slip occurs between the two materials during forging. As a result, an oxide film on the surfaces is not destroyed, this film inhibiting strong bonding between the materials. As one means for increasing this bonding strength, fiber reinforcement may be used. This tends to create stress concentrations to occur on the interfaces between the matrix and the reinforcing fibers or material, such that an insufficient fatigue strength at high temperatures is the result. Also, this method of manufacture increases the manufacturing cost, and generally can not be used when it is desired that only a small portion of the piston (such as the area about the piston ring groove(s)) be formed of a different material.

In a second arrangement, it is known to make a two-layer composition by powder-forming quenched powder aluminum matrices (powder metal) of a common composition, each layer having a different ratio of included ceramic powder. The two-layer composition is then heat-pressed to form a body. The body is then heat-forged into form a piston, with the head portion containing a higher ratio of ceramic powder and the skirt portion contain a lower ratio of ceramic powder.

This arrangement has the disadvantage that insufficient joining strength results at the joining interface between the two compositions, especially in the center. One cause for this is now believed to be that relatively little slip occurs at the interface between the layers during forging. Also, since each layer is constructed from the same matrix material, it is not possible for a lower portion (forming the skirt) to constitute a material which is easily formed, and for a top portion (forming the head) to have high hardness, heat resistance and the like.

In a third known arrangement, a head portion of the piston is constructed of forged powdered metal or fiber reinforced metal, the skirt portion is made of an aluminum alloy casting, and the two portions are welded together. When the two parts are welded together, however, a brittle alloy layer is produced in the welded portion, contributing to low joining strength. Also, in the area of the weld, the basic characteristics of the powdered metal, that of high fatigue strength, proof strength and hardness, are lost. When the joining occurs by friction welding, burrs are produced in the welded portion. These burrs can cause stress concentrations and must be removed. However, the removal of the burrs is made difficult, at least on the inside of the piston, because the piston's irregular shape. Also, when the head portion is constructed of FRM, stress concentrations occur on the interface between the reinforcing materials, such as whiskers and short fibers, and the matrix. As a result, insufficient fatigue strength is provided at high temperatures.

An improved piston and method of constructing a piston are desired.

SUMMARY OF THE INVENTION

In accordance with the present invention, there is provided an improved piston of the type utilized in an internal combustion engine and a method of making the piston.

In the method of the present invention, a first block of a first alloy and a second block of a second alloy are press-forged to form the piston. Preferably, the first alloy comprises an aluminum-silicon based alloy, and the second alloy an aluminum-iron based alloy.

In the preferred arrangement, the piston is formed to have a head and a skirt, with the blocks arranged so that at least a portion of the head is formed from the second alloy and at least a portion of the skirt is formed from the first alloy during the forging process. In this manner the head comprises a hard, heat resistant material while the skirt comprises a more formable material for ease of forming the thin-walled skirt.

In the preferred method, the first and second blocks contact one another along a first, generally planar interface before forging, and then join along a second, non-planar interface after forging. As a result of this transformation, the oxide layers on the first and second blocks are destroyed so that the alloy material forming each block directly bond to one another.

Further objects, features, and advantages of the present invention over the prior art will become apparent from the detailed description of the drawings which follows, when considered with the attached figures.

BRIEF DESCRIPTION OF THE DRAWINGS

FIG. 4 is a flow diagram for a method of constructing a piston in accordance with a first embodiment method of the present invention;

FIG. 7(a) is a cross-sectional view of an alternate embodiment piston made in accordance with the method of the present invention;

FIG. 7(b) is a cross-sectional view of another alternate embodiment piston made in accordance with the method of the present invention;

FIG. 7(c) is a side view of a piston illustrated in FIG. 7(a);

FIG. 7(d) is a side view of the piston illustrated in FIG. 7(b);

FIG. 8(a) illustrates a step of making a piston in accordance with a second embodiment method of the present invention;

FIG. 8(b) illustrates a second step of the method of the second embodiment of the present invention;

FIG. 9(a) illustrates a step of making a piston in accordance with a third embodiment method of the present invention;

FIG. 9(b) illustrates a second step of the method of the third embodiment of the present invention;

FIG. 10(a) illustrates a step of making a piston in accordance with a fourth embodiment method of the present invention;

FIG. 10(b) illustrates a second step of the method of the fourth embodiment of the present invention;

FIG. 11(a) illustrates a step of making a piston in accordance with a fifth embodiment method present invention;

FIG. 11(b) illustrates a second step of the method of the fifth embodiment of the present invention;

FIG. 12(a) illustrates a step of making a piston in accordance with a sixth embodiment of the present invention;

FIG. 12(b) is a cross-sectional view of a piston formed in the step illustrated in FIG. 12(a);

FIG. 12(c) is a cross-sectional view of a piston formed in the step illustrated in FIG. 12(a) after subsequent machining;

FIG. 12(d) is a top view of the piston illustrated in FIG. 12(c);

FIG. 12(e) is a cross-sectional view of an alternate arrangement piston from that illustrated in FIG. 12(c)

DETAILED DESCRIPTION OF THE PREFERRED EMBODIMENTS OF THE INVENTION

The present invention is a piston 20 for use in an internal combustion engine, and a method of making the piston. In general, the piston of the present invention comprises a head portion and a skirt portion. The piston comprises two different alloy materials bonded together to form the unitary body of the piston.

In accordance with a method of the present invention, portions of first and second alloys are press-forged together in a manner whereby an original interface between the alloys is elongated or enlarged. Relative movement or slippage between the mating alloys destroys surface oxide layers and promotes bonding between the alloys.

Figure 1:
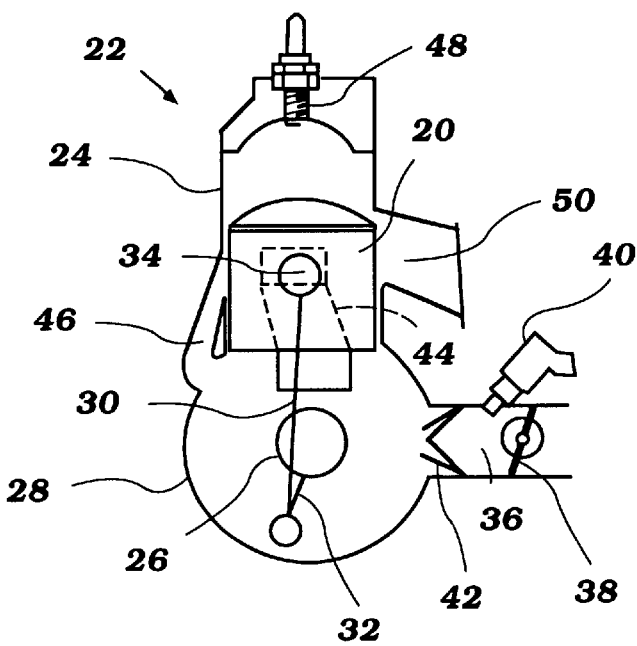
FIG. 1 is a simple illustration of an internal combustion engine arranged to operate on a two-cycle principle.

FIG. 1 illustrates an engine 22 of the type which operates on a two-cycle principle and with which the piston 20 of the present invention may be used. This engine 22 has a cylinder 24 in which the piston 20 is movably mounted. A crankshaft 26 is rotatably positioned within a crankcase 28 below the cylinder 24. The piston 20 is connected to the crankshaft 26 via a connecting rod 30 and crank arm 32. The crank arm 32 has one end connected to the crankshaft 26 and a second end connected to the connecting rod 30. The connecting rod 30 extends from the crank arm 32 to a piston pin 34 positioned within an interior of the piston 22.

Air is supplied to the cylinder 26 through an intake passage 36. The rate of air flow through the passage 36 to the cylinder 24 is governed by a throttle 38.

Fuel is supplied to the engine 22 through a fuel injector 40 or similar charging apparatus. The injector 40 supplies fuel into the air stream flowing through the intake passage 36.

The air and fuel mixture selectively flows through a reed-type valve 42 into the crankcase 28. The mixture then flows, at the times described below, from the crankcase 28 into the cylinder 24 through primary and secondary scavenging passages 44,46.

The air and fuel mixture supplied to the cylinder 24 is ignited by suitable ignition means, such as a spark plug 48. The exhaust generated within the cylinder 24 is exhausted through an exhaust passage 50.

The operation of this engine 22 will now be described. First, as the piston 20 moves upwardly in the cylinder 24, low pressure is generated within the crankcase 28 which causes a charge of air and fuel to be drawn into the crankcase 28 through the reed-type valve 42. At the same time, a charge already in the cylinder 24 is compressed by the upwardly moving piston 20, the charge prevented from flowing through the exhaust passage 50 and scavenging passages 44,46 because the piston covers them.

Once near the top of the cylinder 24 (i.e. top dead center) and with the charge compressed, the spark plug 48 is activated, and the resulting spark ignites the charge. The expansion of the charge as it burns within the cylinder 24 forces the piston 20 downwardly (and effectuates a rotation of the crankshaft 26). As the piston 20 moves downwardly, the exhaust passage 50 is first uncovered, allowing the exhaust to flow therethrough.

At the same time, the piston 20 causes the next charge within the crankcase 28 to be partially compressed. Once the piston 20 has moved downwardly a sufficient distance to uncover the scavenging passages 44,46, the charge flows from the crankcase 28 through the scavenge passages 44,46 into the cylinder.

After the piston 20 reaches the bottom of the cylinder 24 (i.e. bottom dead center), with the crankshaft 28 still rotating, the piston 20 is driven back upwardly and the process repeats itself.

Thus, it may be seen that in an engine 22 operating on a two-cycle principal, a full cycle is completed during each single revolution of the crankshaft 26. That is, each complete cycle occurs during one piston reciprocation.

Figure 2:
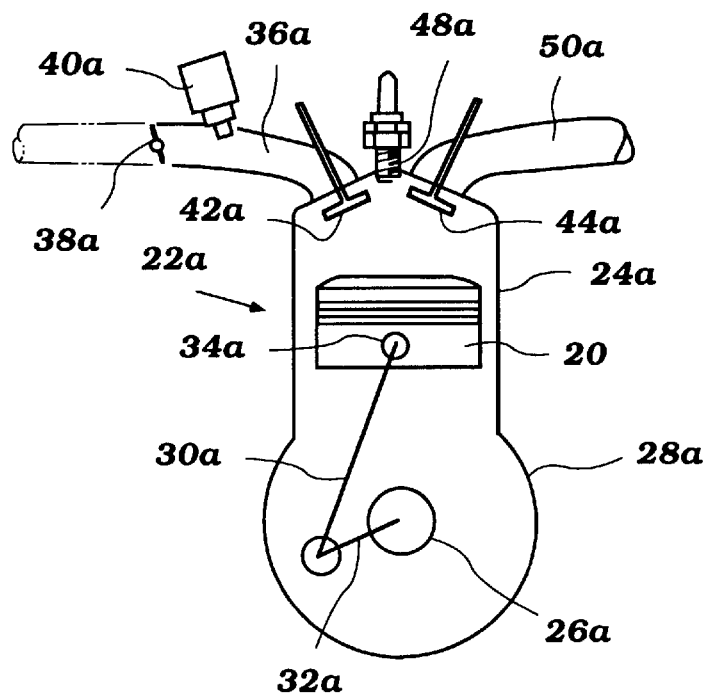
FIG. 2 is a simple illustration of an internal combustion engine arranged to operate on a four-cycle principle.

FIG. 2 illustrates an engine 22a of the type which operates on a four-cycle principle and with which the piston 20 of the present invention may be used. This engine 22a also has a cylinder 24a in which the piston 20 is movably mounted.

Again, a crankshaft 26a is rotatably positioned within a crankcase 28a of the engine 22a The piston 20a is connected to the crankshaft 26a via a connecting rod 30a extending from a piston pin 34a of the piston to a crank arm 32a extending from the crankshaft 26a.

In this engine 22a, the intake passage 36a extends directly to the cylinder 24a. A throttle 38a is utilized to control the flow rate of air through the passage 36a. A fuel injector 40a or similar apparatus as known to those skilled in the art is utilized to deliver fuel into the air. In this engine, at least one intake valve 42a controls the passage of the air and fuel charge into the cylinder 24a, in the manner described in more detail below.

A spark plug 48a is utilized to ignite the air and fuel charge within the cylinder 24a, and an exhaust passage 50a leads from the cylinder. At least one exhaust valve 44a is utilized to control the flow of exhaust from the cylinder 24a.

The operation of this engine 22a is as follows. As the piston 20 approaches the top of the cylinder 24a (moving upwardly) both valves 42a,44a are closed and an air and fuel charge within the cylinder 24a is compressed. The spark plug 48a is activated, with the resultant spark causing ignition of the charge. The expansion force drives the piston 20 downwardly in the cylinder 24a, thus effectuating a rotation of the crankshaft 26a.

The piston 20 moves to its bottom dead center position, and then rises upwardly again within the cylinder 24a. As this occurs, the exhaust valve 44a opens, and the upward movement of the piston 20 forces the exhaust out of the cylinder 24a through the exhaust passage 50a.

After the piston 20 moves to top dead center, it begins moving downwardly again. This exhaust valve 44a closes, and the intake valve 42a opens, and the downward movement of the piston 20 draws an air and fuel mixture into the cylinder 24a. The piston moves to bottom dead center again, and then moves back upwardly in the cylinder 24a. With the valves 42a,44a both closed, the piston 24a compresses the newly drawn charge for ignition, and the cycle repeats itself.

Thus, it may be seen that an engine 22a operating on a four-cycle principle has its crankshaft rotate two complete revolutions per cycle. In other words, the piston must reciprocate two times for each combustion cycle.

Figure 3:
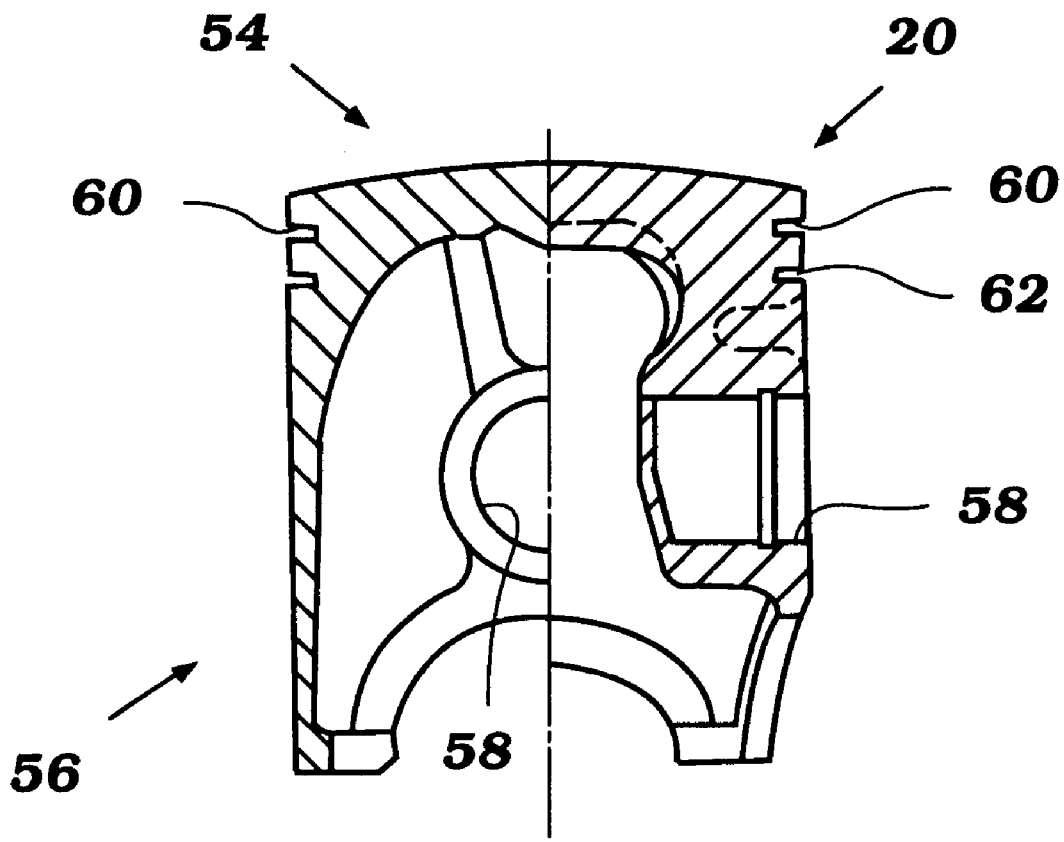
FIG. 3 illustrates, in cross-section, a piston utilized with an engine such as that illustrated in FIG. 1 or 2.

FIG. 3 illustrates a piston 20 of the type utilized in the engines 22,22a described above. The right and left hand portions of this Figure illustrate cross-sectional views of the piston 20 at planes passing through the piston at right angles. The piston 20 has a head portion 54 and a skirt portion 56 depending therebelow. A boss 58 is formed within the piston 20, the boss 58 defining a pin connection for the connecting rod.

The boss 58 is positioned below first and second ring grooves 60,62 formed in the exterior of the piston 20. A compression ring (not shown) is preferably positioned in the top groove 60, and a compression and/or oil sealing ring (not shown) is preferably positioned in the second groove 62.

As illustrated, the portion of the piston 20 near the boss 58 is fairly thick, so as to provide support for the connecting rod connection. The skirt portion 56 of the piston 20, however, is a generally circular wall having a thickness which reduces moving in a direction opposite the head 54.

FIG. 4 is diagramatically illustrates a method of forming a piston 20 in accordance with the present invention. In a first step (A), an alloy (the term "alloy" herein generally refers to a material which comprises other than a single metal) ingot 64 for the skirt portion of the piston 20 is prepared. Preferably, this ingot comprises an alloy of aluminum (Al), silicon (Si), copper (Cu) and magnesium (Mg). In general, the silicon is added to increase wear and seizure resistance. The silicon causes precipitation of hard initial or eutectic crystals in the metallic composition which allow the alloy to have these features.

The copper and magnesium are added to increase the alloy's strength at high temperatures. In a first embodiment, the alloy additives by weight percent are preferably 5–25% Si, 0.5–5% Cu and 0.5–1.5% Mg. Generally, it has been found that outside of these ranges the intended resistance to wear and seizure, and the high strength at high temperatures are not achieved.

In addition, the following specific alloys have been found advantageous for use as the alloy forming at least a portion of the skirt of the piston 20. These alloy embodiments are preferably manufactured by continuous casting or extrusion forming and then cut into the desired block, and may also be formed from powder metals, as described in more detail below.

(1) Al containing the following alloying elements by percentage weight: between 5–25 Si; 1 or less than 1 Fe (iron); between 0.5–5 Cu (copper); between 0.5–5 Mg (magnesium); 1 or less than 1 Mn (manganese); 1 or less than 1 Ni (nickel); and 1 or less than 1 Cr (chromium);

(2) Al containing the following alloying elements by percentage weight: between 5–25 Si; 1 or less than 1 Fe;

between 0.5–5 Cu; between 0.5–5 Mg; 1 or less than 1 Mn; 1 or less than 1 Ni; 1 or less than 1 Cr; 1 or less than 1 Zr (zirconium); 1 or less than 1 Mo (molybdenum); and 5 or less than 5 SiC (silicon carbide) or BN (boron nitride) or AlN (aluminum nitride) or $Al_2O_3$ (aluminum oxide), where the SiC, BN, AlN and $Al_2O_3$ can be combined instead of using only one of them, as long as the total weight of the combination is within the desired range; and (3) Al containing the following alloying elements by percentage weight: between 5–25 Si; 1 or less than 1 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; between 1 and 10 C (carbon) or $MoS_2$ (molybdenum disulfide); and 5 or less than 5 SiC or $Al_2O_3$, where the C and $MoS_2$ may be combined instead of using just one of them, as long as the combined weight is within the desired range.

Each alloying element may be separately prepared as a powder or ingot and then melted into the base metal.

This ingot 64 of alloy is melted and a block for the skirt portion of the piston 20 is prepared by continuously casting or extruding the alloy into a cylindrically shaped extrusion 66. The alloy formed in this manner has a lower resistance to deformation at high temperatures than the alloy described below for use as the head of the piston 20. In particular, the yield strength of this alloy at approximately 400° C. is about 50% of the alloy described for use as the head of the piston 20. Thus, this alloy is relatively formable, making it easier to form the alloy into the skirt of the piston.

The cylindrically-shaped extrusion 66 is then cut into individual blocks 68 in step (C). Each block 68 is then prepared for mating with another block, described below, for use in forming the piston 20.

In a step (D), an ingot 70 is prepared for forming the head portions of the pistons 20. This alloy preferably comprises Al, Fe and Si. The iron is added for increasing the fatigue strength at temperatures above 200° C. The silicon is added for increasing resistance to wear and seizure as described above, and for lowering the melting point of the alloy. The alloying amount of silicon is kept low so that excessive ductility and low strength of the alloy is prevented, and so that the heat resistance is also not lowered excessively. In that regard, the silicon preferably comprises more than 5% by weight of the alloy, and the weight amount of iron preferably comprises more than 5%.

Specific alloys contents which have been found suitable are as follows. These first three alloy embodiments are preferably manufactured by continuous casting or extrusion forming and then cut into the desired block.

(1) Al containing the following alloying elements by percentage weight: between 5–25 Si; between 1–3 Fe; between 0.5–5 Cu; between 0.5–5 Mg; 1 or less than 1 Mn; 1 or less than 1 Cr; 1 or less than one Zr; 1 or less than 1 Mo; and approximately 0 SiC;

(2) Al containing the following alloying elements by percentage weight: between 5–25 Si; between 1–3 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and between 1–10 SiC (the mean diameter of the SiC being between about 1 and 20 microns);

(3) Al containing the following alloying elements by percentage weight: between 5–25 Si; between 1–3 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and between 1–10 SiC, BN, AlN or $Al_2O3$, where the SiC, Al2O3, BN and AlN can be compounded instead of containing one of them if the compound weight totals within the 1–10% range.

The following alloys are preferably made from powder metals:

(4) Al containing the following alloying elements by percentage weight: 5 or less than 5 Si; 5 or greater than 5 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and approximately 0 SiC;

(5) Al containing the following alloying elements by percentage weight: 5 or less than 5 Si; 5 or greater than 5 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and between 1–10 SiC (having a mean diameter of about 1–20 microns);

(6) Al containing the following alloying elements by percentage weight: 5 or less than 5 Si; 5 or more than 5 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and between 1–10 SiC, BN, AlN or $Al_2O_3$, where the SiC, $Al_2O_3$, BN and AlN can be combined instead of containing only one of them if the compound weight totals within the 1–10% range.

(7) Al containing the following alloying elements by percentage weight: 5 or less than 5 Si; 5 or more than 5 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; between 1–10 C or $MoS_2$; and between 1–10 SiC or $Al_2O_3$, where the C and $MoS_2$ can be combined instead of containing one of them if the combined weight totals within the 1–10% range;

(8) Al containing the following alloying elements by percentage weight: between 5–25 Si; between 1–10 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and approximately 0 SiC;

(9) Al containing the following alloying elements by percentage weight: between 5–25 Si; between 1–10 Fe; between 5—5 Cu; between 0.5–5 Mg; 1 or less than 1 Mn; 1 or less than 1 Ni; 1 or less than 1 Cr; 1 or less than 1 Zr; 1 or less than 1 Mo; and between 1–10 SiC (with a mean diameter of between about 1–20 microns);

(10) Al containing the following alloying elements by percentage weight: between 5–25 Si; between 1–10 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; and between 1–10 SiC, BN, AlN or $Al_2O_3$, where the SiC, $Al_2O_3$, BN and AlN can be combined instead of containing only one of them if the combined weight totals within the 1–10% range; and

(11) Al containing the following alloying elements by percentage weight: between 5–25 Si; between 1–10 Fe; between 0.5–5 Cu; between 0.5–5 Mg; 1 or less than 1 Mn; 1 or less than 1 Ni; 1 or less than 1 Cr; 1 or less than 1 Zr; 1 or less than 1 Mo; between 1–10 C or $MoS_2$; and between 1–10 SiC or $Al_2O_3$, where the C and $MOS_2$ can be combined instead of containing one of them if the combined weight totals within the 1–10% range.

It is noted that carbon and molybdenum disulfide both serve to produce an alloy which is smooth, promoting slidability of the resultant piston.

Once again, the alloying elements may be formed into separate ingots or be provided as powder and be melted or mixed together with the base metal to form the alloy.

Once the ingot 70 is formed, it is melted and quench-solidified at a high cooling rate of about 100° C. per second.

An alloy powder 72 is produced (see step (E)). In step (F), the powder is heated and extruded into a solidified cylindrically-shaped extrusion 76. The extrusion 76 formed in this manner advantageously provides a metallic composition provides a structure which is generally free from stress concentrations, providing a high fatigue strength. Unlike the cooling in an ordinary casting in which a coarse iron composition is produced in the alloy, resulting in low strength, this formation method prevents the coarse iron composition from forming.

Next, in step (G), the extrusion 76 is cut into blocks 78 for forming the head of a piston 20.

In step (H), the blocks 68,78 for the head and skirt portions of the piston 20 are stacked, with a parting agent applied. In step (I), the stacked blocks 68,78 are heated so as to increase their formability. In step (J), the stacked blocks 68,78 are positioned between a pair of dies, and pressed between the dies with high force to form the integral piston shape. During this process, the two blocks 68,78 are joined in a manner described below into a single piston member 20. This piston 20 member as formed includes the skirt and head portions 54,56.

In step (K), the piston 20 product is heat-treated to increase its strength. Finally, in step (L), the piston 20 is finished by forming the one or more ring grooves 60 therein, and burrs and other surface irregularities are removed by machining. After this, a surface treatment such as plating may be applied as required on the outside surface of the skirt portion 56 of the piston 20 for increasing the slidability and wear resistance of this portion of the piston 20.

As formed, the piston 20 comprises a single member formed of two different alloy materials joined together.

Figure 5A:
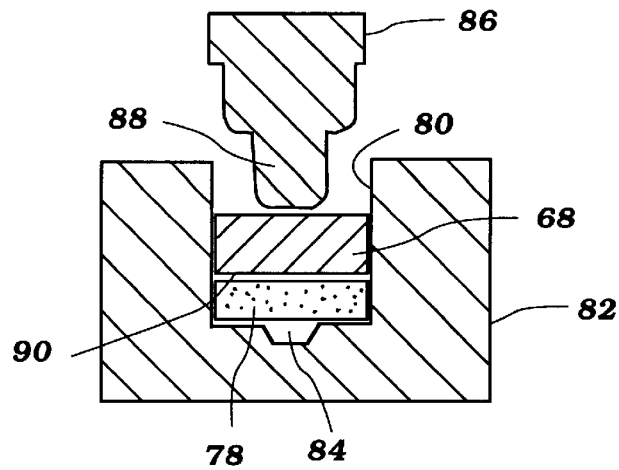
FIG. 5(a) illustrates, in cross-section, a stacking step of the method illustrated in FIG. 4.
Figure 5B:
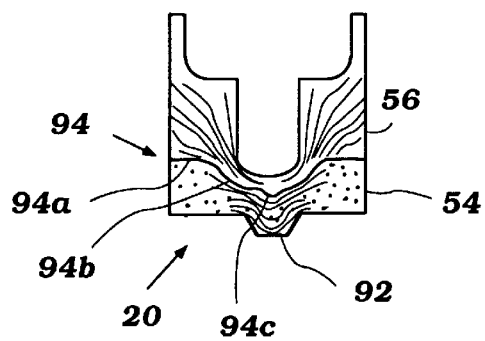
FIG. 5(b) is a cross-sectional view of the piston formed in the method illustrated in FIG. 4 after a forging step thereof.
Figure 5C:
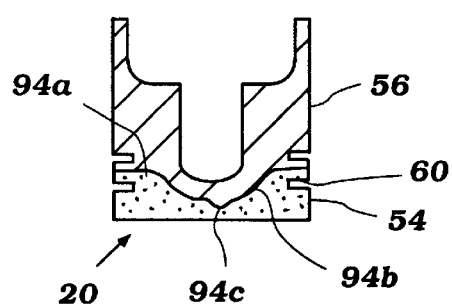
FIG. 5(c) is a cross-sectional view of the piston formed in the method illustrated in FIG. 4 after completion of surface machining.
Figure 6A:
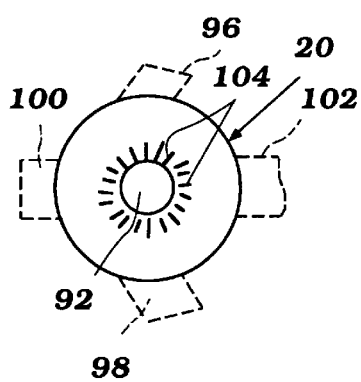
FIG. 6(a) is a top view of a first arrangement for a projection extending from the piston formed in the method illustrated in FIG. 4.
Figure 6B:
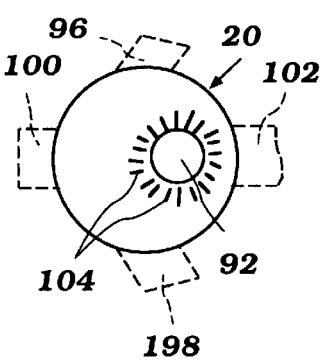
FIG. 6(b) is a top view of a second arrangement for a projection extending from the piston formed in the method illustrated in FIG. 4.
Figure 6C:
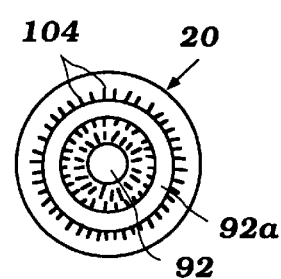
FIG. 6(c) is a top view of a third arrangement for a projection extending from the piston formed in the method illustrated in FIG. 4.
Figure 6D:
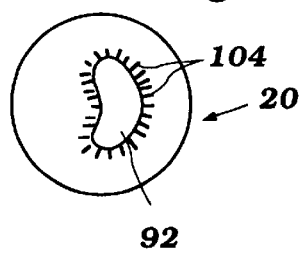
FIG. 6(d) is a top view of a fourth arrangement for a projection extending from the piston formed in the method illustrated in FIG. 4.
Figure 6E:
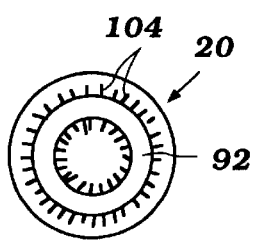
FIG. 6(e) is a top view of a fifth arrangement for a projection extending from the piston formed in the method illustrated in FIG. 4.

FIGS. 5(*a*–*c*) illustrate in more detail the process steps (I–L) of FIG. 4. As illustrated, the stacked blocks 68,78 are positioned within a main recess 80 of lower die 82, the top block 68 comprising the formable aluminum-silicon alloy and the bottom block 78 comprising the durable aluminum-iron alloy. This lower die 82 preferably also includes a sub-recess 84. A top die or punch 86 having a projected portion 88 is utilized to press the stacked blocks 68,78.

Before forging, the stacked blocks 68,78 are in contact with one another at a contact face 90. Before forming, this face or surface 90 is planar.

The shape of the top die 86 is chosen, as known to those skilled in the art, to cooperate with the lower die 82 to form the blocks 68,78 into a single mass having the desired piston shape with high dimensional accuracy, but without deteriorating the characteristics of the alloys forming the two blocks.

In the process step (I), as illustrated in more detail in FIG. 5(*a*), in a hot forging step the top die 86 is moved downwardly into the recess 80 in the lower die 82. In this process, alloy comprising the first block 68 rises upwardly along the sides of the top die 86 to form the skirt portion of the piston. In addition, as the top die 86 presses below the level of the original interface 90, the periphery of the block 78 also rises, further driving the skirt portion upwardly and thinning the block 78 to form a piston head with a thin or short land.

After this step, the piston 20 shape is formed, as illustrated in FIG. 5(*b*). As illustrated, the piston 20 has a projected part 92 corresponding to the alloy material which was pressed into the recess 84 within the lower die 82.

After forging, an interface 94 is formed between the two alloys which is different from the original surface or interface 90. In particular, the new interface 94 includes a peripheral part 94*a* which is positioned higher than the original interface 90, a dome portion 94*b* which extends downwardly in convex fashion to a point lower than the original interface 90, and a apex portion 94*c* dipping towards the projection 92. It is now apparent that the recess 84 within the lower die 82 contributes to the formation of this interface 94 shape by permitting the alloys forming the piston to flow into the recess as the top die 86 moves downwardly.

FIG. 5(*b*) also illustrates that a grain or fiber direction is introduced into the alloys forming the piston 20 during the forging step. These grains of the alloys are also elongated.

Notably, the surface area of the new interface 94 is enlarged as compared to the area of the original interface 90. During this stretching or elongation of the original interface 90, relative movement between the two alloys occurs at the interface. This slippage and enlargement contributes to the destruction of oxide films which exist on the outside surfaces of the blocks 68,78. When the oxide films are destroyed, the alloy of the first block 68 comes into direct contact with the alloy of the second block 78, resulting in a strong joining between the two alloys after forging.

FIG. 5(*c*) corresponds to step (L) in FIG. 4. As illustrated, various machining steps are performed on the piston 20 after forging. First, the projection 92 is removed from the head portion 54 of the piston 20. Next, one or more piston ring grooves 60 are formed in the exterior of the piston 20. In this step the grain or fiber flows illustrated in FIG. 5(*b*) remain undisturbed.

In conjunction with FIGS. 6(*a*–*e*), it is noted that more than one projection (92) may be formed during the forging process, and the projection need not necessarily be formed in the center of the head portion 56 of the piston 20.

FIG. 6(*a*) is a top view illustrating the embodiment piston described above where the projection 92 is in the center of the head portion 54. The broken lines in this drawing illustrate the positions of a pair of main scavenging passages 96,98, a secondary scavenging passage 100, and an exhaust passage 102 when the piston 20 is positioned within a cylinder of a two-cycle engine.

FIG. 6(*b*) illustrates an arrangement in which the projection 92 is formed offset from the center of the head portion 54 of the piston 20. This arrangement is advantageous since the portion of the piston 20 adjacent the exhaust passage 102 (where the temperature is very high) is strengthened. Of course, a similar circular projection 92 may be formed in other locations about the head portion 54.

FIG. 6(*c*) illustrates an example of a circular projection 92 formed in the center of the head portion 54 and surrounded by an annular projection 92*a*.

FIG. 6(*d*) illustrates an example of a non-circular projection 92.

FIG. 6(*e*) illustrates an example in which only an annular-shaped projection 92 is formed and extends from the head portion 54 of the piston 20.

In each of these figures, lines 104 are used to illustrate the direction of grain or fiber flow within the alloy. In general, the flow direction is generally radial from the extruded projections 92.

In each of the variations illustrated in FIG. 6, commonality exists in that the goal during press-forging is to cause the interface between the original alloy block 68,78 to increase, whereby relative slippage or movement between the each contacting surface of the blocks 68,78 occurs. Again, this contributes to the break-up of oxide films on the contacting surfaces 68,78 of the blocks, permitting the alloys to bond securely to one another.

While the above-described piston 20 has its entire head portion 54 formed from the aluminum-iron alloy, it is possible to form the piston so that only a part of the head portion 54 of the piston comprises this alloy. FIGS. 7(*a–d*) illustrate such arrangements.

FIGS. 7(*a*) and (*c*) illustrates an arrangement in which only the periphery of the head portion 54 of the piston 20 is formed from the aluminum-iron alloy (i.e. from the alloy forming block 78 described above), while the remainder of the head portion and the entirety of the skirt portion 56 is formed of the aluminum-silicon alloy (i.e. from the alloy forming block 68 described above). In this manner, the periphery of the head portion 54 comprises the alloy which has a high heat resistance, while the remainder of the piston 20 is formed of the alloy which has good forming properties. In fact, the peripheral edge of the head portion 54 will withstand a temperature of about 350° C. without deformation.

Also, this arrangement causes the two alloys to join along a curved surface after forging. As described above, when the generally planar interface between the two alloy blocks is increased (as occurs when the surfaces are stretched to form the elongated curved surface) bonding of the alloys results with the oxide layers destroyed.

This arrangement also permits the land portion of the piston 20 to be thinner than in the ordinary case. This reduces crevice or squish volume within the cylinder when the piston is in use, and thus reduces the amount of unburned gas, improving engine emission quality.

FIGS. 7(*b*) and (*d*) illustrate an example in which the portion of the aluminum-iron alloy (from block 78) is made thicker in the part of the head portion 54 of the piston 20 corresponding to the intake and exhaust passages of the cylinder in which it is to be utilized. FIG. 7(*d*) illustrates how the thickness of the aluminum-iron layer is varied so as to be wavy, being thin at the piston pin bosses 58, and thick in the remaining areas.

FIGS. 8(*a*) and (*b*) illustrate a second embodiment method of making a piston 20 in accordance with the present invention. In arrangement, the bottom side of the block 78 of the aluminum-iron alloy is formed with a recess 106. In the forging process, the top die 86 is moved downwardly until the recess 106 is filled with material (the top die 86 moves to a distance H1 above the bottom die 82 which is less than a depth H of the original interface 90). This arrangement causes the original interface 90 to transform into the three-part interface 94*a*,94*b*,94*c* having a shape similar to that described above. Once again, the transformation of this interface results in oxide layer destruction and then strong bonding between the alloying materials of the two blocks 68,78. Also, even though this forging process creates a piston having the same advantageous structure as described above, no projection is formed from the head portion which must be removed in a later machining step. Also, the recess 106 may be formed in the block 78 during a sintering step during which a pre-forging alloy layer is provided.

FIGS. 9(*a*) and (*b*) illustrate a third embodiment method of making a piston 20 in accordance with the present invention. In this arrangement, the bottom die 82 has a generally annular recess 108 extending from the main recess 80. As the top die 82 is lowered, the periphery of the alloy forming the block 68 rises to form the skirt portion 56 of the piston 20. As the die 86 is lowered further, a ledge 112 of the die restricts further upward movement of the alloy forming the block 68, and the periphery of the alloy forming the block 78 is forced into the recess 108, forming a projection 110.

In this case, the original interface 90 between the blocks 68,78 rises to an outer interface section 94*a*, an even higher section 94*b* inwardly thereof, and then drops into a low central portion 94*c*. Once again, this elongation of the interface causes oxide layer destruction and results in strong bonding between the alloys forming the original blocks 68,78. Once forging is complete, the projection 110 is machined off of the piston 20.

FIGS. 10(*a*) and (*b*) illustrate a fourth embodiment method of making a piston 20 in accordance with the present invention. This method is primarily directed to making a piston 20 arranged as illustrated in FIG. 7(*a*). In this method, the bottom die comprises a mating right and left die halves 82*a*,82*b*. The halves 82*a*,82*b* cooperate to form the recess 80, and each half 82*a*,82*b* has a separate recess 114 extending generally radially outward from the main recess 80.

In this case the bottom alloy block (i.e. the aluminum-iron alloy) 78 is generally ring-shaped, and the top alloy block 68 has a projecting portion 68*a* which fits within the otherwise hollow center portion of the bottom block 78. The blocks 68,78 contact one another along an interface 90 which has portions extending generally at right angles to one another.

During forging, material from both blocks 68,78 is forced into the recess 114 of the lower die halves 82*a*,82*b*, forming a circumferential projection 116. The forging also transforms the original interface 90 into an elongate curved interface 94. Once again, the later interface 94 has a greater surface area (and length in a single dimension) than the original interface 90, with relative movement or slippage between the blocks 68,78 during forging causing the bonding as described above. The projection 116 is then removed in a post-forging process.

FIGS. 11 (*a*) and (*b*) illustrate a fifth embodiment method of making a piston in accordance with the present invention. This embodiment is similar to the last, except that an annular or donut-shaped recess 118 (instead of recess 114 as in FIGS. 10(*a*) and (*b*)) is provided in the bottom die 82 extending from the main recess 80. Preferably, blocks 68,78 having the same shapes as those described in conjunction with the method of FIGS. 10(*a*) and (*b*) are utilized in this method.

In this method, when the top die 86 is moved downwardly, the alloy material of both blocks 68,78 is pressed downwardly into the recess 118, forming projection 120 from the formed piston 20. Once again, the movement of this alloy material into the recess 118 has the effect of lengthening the original interface 90 between the blocks 68,78 into a longer interface 94, thereby bonding the two alloys together. Once formed, the projection 120 is removed by machining.

FIGS. 12(*a–e*) illustrate a method of forming a piston 20 in accordance with a sixth embodiment of the present invention. The piston 20 created as a result of this method is best suited to use in an engine operating on a four-cycle principle.

As illustrated in FIG. 12(*a*) (corresponding to step (1) in FIG. 4), a block 68 of the aluminum-silicon alloy is placed upon a block 78 of the aluminum-iron alloy of the type described in detail above. The stacked blocks 68,78 are positioned within the recess 80 of the heated lower die 82, and then pressed with a top die 86 to forge-form the piston 20.

Preferably, four projections 122 extend upwardly from the bottom of the recess 80 in the lower die 80 for forming four recesses 124 in the head portion 54 of the produced piston 20 (see FIG. 12(*d*)). These recesses 124 to correspond to two intake and two exhaust valves of a four-cycle engine.

In addition, recesses 128 are provided in the top die 86 for producing projections 126 inside the piston 20.

As the top die 86 is pressed downwardly, the alloy material from both blocks 68 rises upwardly into the recesses 128 in the top die 86. In this manner, the original flat interface 90 between the blocks 68,78 is changed into a wavy or non-planar interface. Most importantly, the surface area of the interface is enlarged, for greater bonding area. Because the elongation (when viewing a single dimension) of the blocks 68,78 is different in different areas, the two blocks 68,78 must move relative to one another during the forging. This destroys the oxide layers on the blocks 68,78 at the interface 94, thus contributing to the bonding of them. Once again, grain or fiber flows are introduced into the alloy materials as a result of the pressing force of the top die 86.

FIG. 12(c) illustrates a step corresponding to step (L) of FIG. 4. Here, at least one piston ring groove 60 has been formed into the piston 20. This processing is done in a manner which prevents disruption of the grain or fiber flows.

As an alternate arrangement, and as illustrated in FIG. 12(e), the piston 20 may be formed without the projections 126 with use of a top die 86 which does not include the recesses 128. In this case, a wavy interface (as defined by sections 94a and 94b) is still created, as a portion of the alloy in the bottom block 78 is pressed upwardly into the top block 68 as a result of the projections 122.

Figure 13:
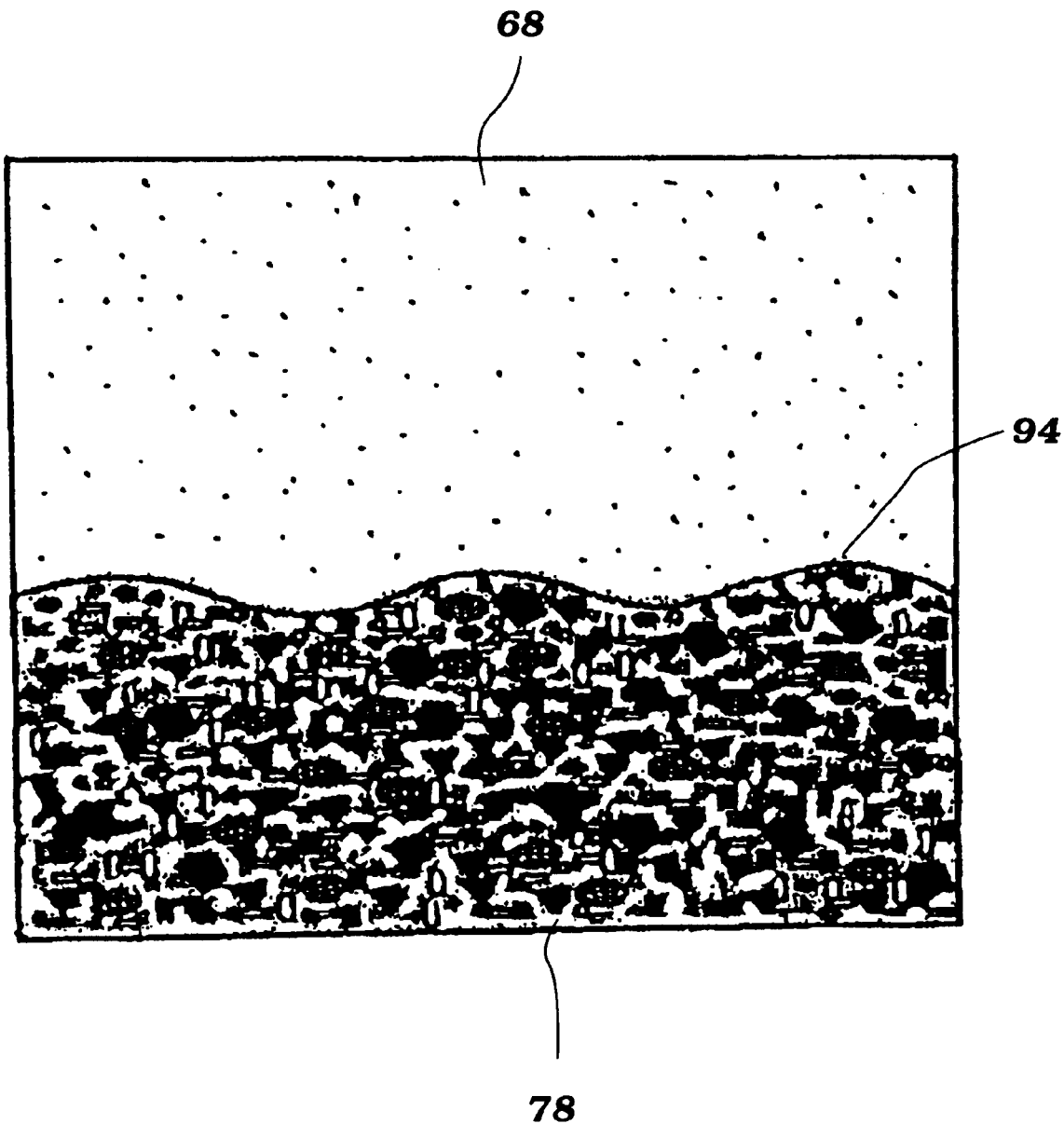
FIG. 13 is an enlarged cross-sectional microscopic illustration of the material forming the piston manufactured in accordance with the method of the present invention.

FIG. 13 is an enlarged view of an interface texture drawn in reference to a microscopic photograph of the joining interface of the piston 20 of the present invention. In this case, the interface 94 is wavy, and created during forging which results in a relative slip of the two alloy materials.

The piston of the present invention has a head which comprises at least a portion of an alloy which has very high strength, low deformation at high temperatures, and is slidable. At the same time, the skirt portion comprises at least a portion of an alloy which, while also strong so that the skirt may have a thin wall thickness, is also formable so that the piston may be easily formed in press-forging operation. The piston is light-weight, since the alloy is an aluminum alloy. The piston has a short land due to the manufacture of least a portion of the head of the high-strength and low deformation alloy. The two alloys are securely bonded to one another to form an integral piston member.

While specific examples of the alloy contents for the alloys which are utilized to form the head and skirt portions are described above, it is contemplated that other alloy variations may be found satisfactory.

Also, specific press-forging arrangements have been described for use in causing the relative slippage and grain elongation resulting in oxide layer destruction and strong bonding between the alloys. It is contemplated that a wide variety of other die arrangements and the like may be utilized to achieve this result.

Further, while the two alloys have been described as used as blocks which are press forged, the alloys may have a variety of shapes or forms. Also, it is contemplated that more than one separate alloy may be used in the method of the invention, resulting in a piston comprising three of more bonded alloys.

Of course, the foregoing description is that of preferred embodiments of the invention, and various changes and modifications may be made without departing from the spirit and scope of the invention, as defined by the appended claims.

What is claimed is:

1. A method of making a piston for an internal combustion engine comprising the steps of: forming a first cylindrical block of solid material from a first alloy; forming a second cylindrical block of solid material from a second alloy; placing a flat surface of said second block into engagement with a corresponding flat surface of said first block so that said blocks abut along a first planar interface having a first surface area; and forge-pressing said first and second blocks together into the shape of a piston having a solid cylindrical head portion integral with a thin wall tubular skirt portion and simultaneously deforming said abutting flat surfaces into a non-planar second interface having a second area larger than said first area and wherein said blocks are forge bonded along said second interface.

2. The method in accordance with claim 1, wherein the engaged first and second blocks are stacked within a main recess of a lower die, and the forge-pressing is performed by pressing a top die into said main recess of said lower die and against said blocks.

3. The method in accordance with claim 2, wherein said lower die has a sub-recess extending from said main recess, and further including the step of deforming at least one of the first and second blocks into said sub-recess to form a projection on the exterior surface of the piston.

4. The method in accordance with claim 1, further comprising the step of forming one of the blocks from an ingot of the respective alloy by melting said ingot, continuous casting said melted ingot into a cylindrical form and cutting the cylindrical form into the cylindrical block.

5. The method in accordance with claim 1, further comprising the step of forming one of the blocks by the steps of forming an ingot of the respective alloy, melting said ingot, quench-solidifying said melted ingot into a power, and compressing said powder into said one block.

6. The method in accordance with claim 1, wherein said first alloy comprises aluminum containing at least one percent by weight iron.

7. The method in accordance with claim 1, wherein said second alloy comprises aluminum containing silicon and no more than one percent by weight of iron.

8. The method in accordance with claim 1, further comprising the step of machining at least one ring groove into said piston.

9. The method in accordance with claim 1, further comprising the step of heat-treating said piston after forging.

10. A method of forming a piston comprising a first alloy and at least one second alloy both having as their main constituent aluminum, said method comprising the steps of: forming a solidified piece of said first alloy; forming a solidified piece of said second alloy; and press-forging said pieces of first and second alloys together into the form of a piston, said step of press-forging further comprising the step of moving an abutting planar surface of said first alloy relative to an abutting planar surface of said second alloy sufficiently during the forging process to deform said planar surfaces into a non-planar configuration and to remove any surface oxides from the abutting surfaces and to form a forged bond therebetween.

11. The method in accordance with claim 10, wherein said pieces of said first and second alloy are stacked and abut along an interface having a first area, and during forging said first and second alloys are joined along an interface having a second area which is greater than said first area.

12. The method in accordance with claim 10, wherein during said press-forging a grain structure of said first alloy and a grain structure of said second alloy in at least that area where said first and second alloys are joined are elongated in at least one direction.

13. The method in accordance with claim 1, wherein both of the alloys are alloys formed with aluminum as their primary constituent and one of the alloys has a characteristic of strength or abrasion resistant that is substantially greater than that of the other alloys.

14. The method in accordance with claim 13, wherein the higher strength or abrasion resistant material forms at least at part of the finished exterior surface of the piston.

15. The method in accordance with claim 13, wherein the piston head portion has at least one ring groove, and the skirt portion has a pair of spaced apart piston pin bosses having openings for receiving a piston pin for providing a connection to an associated connecting rod.

* * * * *